United States Patent
Sacks et al.

(10) Patent No.: US 6,243,224 B1
(45) Date of Patent: Jun. 5, 2001

(54) ASYNCHRONOUS DIGITAL DEMODULATOR AND METHOD FOR A NULL-TYPE SERVO PATTERN

(75) Inventors: Alexei H. Sacks, St. Louis Park; Timothy F. Ellis, Tonka Bay, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/268,584

(22) Filed: Mar. 15, 1999

Related U.S. Application Data

(60) Provisional application No. 60/086,279, filed on May 21, 1998, and provisional application No. 60/086,278, filed on May 21, 1998.

(51) Int. Cl.[7] .................................................. G11B 5/596
(52) U.S. Cl. ................................. 360/77.08; 360/29
(58) Field of Search ........................... 360/77.08, 78.14, 360/48, 51, 29, 39

(56) References Cited

U.S. PATENT DOCUMENTS

| | | | |
|---|---|---|---|
| 4,297,734 | * 10/1981 | Laishley et al. | 360/77.08 |
| 4,511,938 | * 4/1985 | Betts | 360/77.08 |
| 4,535,372 | 8/1985 | Yeakley | 360/77 |
| 4,679,103 | 7/1987 | Workman | 360/77 |
| 4,954,907 | 9/1990 | Takita | 360/78.07 |
| 5,041,926 | * 8/1991 | Ockerse et al. | 360/77.05 |
| 5,089,757 | 2/1992 | Wilson | 318/560 |
| 5,117,408 | 5/1992 | Weispfenning et al. | 369/32 |
| 5,136,439 | 8/1992 | Weispfenning et al. | 360/77.08 |
| 5,345,342 | 9/1994 | Abbott et al. | 360/48 |
| 5,576,906 | 11/1996 | Fisher et al. | 360/77.08 |
| 5,602,692 | 2/1997 | Freitas et al. | 360/77.08 |
| 5,668,678 | * 9/1997 | Reed et al. | 360/77.08 X |
| 5,717,538 | * 2/1998 | Cheung et al. | 360/77.08 |
| 5,774,298 | * 6/1998 | Cheung et al. | 360/77.08 |
| 5,818,659 | 10/1998 | Cheung et al. | 360/77.08 |
| 5,825,579 | 10/1998 | Cheung et al. | 360/77.08 |
| 5,854,714 | 12/1998 | Reed et al. | 360/51 |
| 5,867,341 | 2/1999 | Volz et al. | 360/77.08 |
| 6,034,830 | 3/2000 | Sasamoto | 360/48 |

FOREIGN PATENT DOCUMENTS

| | | |
|---|---|---|
| 0 262 690 | 4/1988 | (EP) . |
| 0 420 439 | 4/1991 | (EP) . |
| 0 789 704 A1 | 3/1997 | (EP) . |
| WO 97/28529 | 8/1997 | (WO) . |

* cited by examiner

*Primary Examiner*—David Hudspeth
*Assistant Examiner*—K Wong
(74) *Attorney, Agent, or Firm*—Westman, Champlin & Kelly, P.A.

(57) ABSTRACT

An asynchronous demodulator and method is provided which determines a position error of a read head relative to a position on a medium in a storage device. The read head generates a read signal as the read head passes over a servo area on the medium. The demodulator generates a normal demodulating signal that is asynchronous with the read signal and a quadrature demodulating signal that is ninety degrees out of phase with the normal demodulating signal. The read signal is sampled to produce a series of digital read values which are multiplied by the normal demodulating signal and the quadrature demodulating signal to produce a plurality of normal and quadrature sample values. The demodulator produces the a position error magnitude and a position error direction based on the plurality of normal and quadrature sample values.

17 Claims, 7 Drawing Sheets

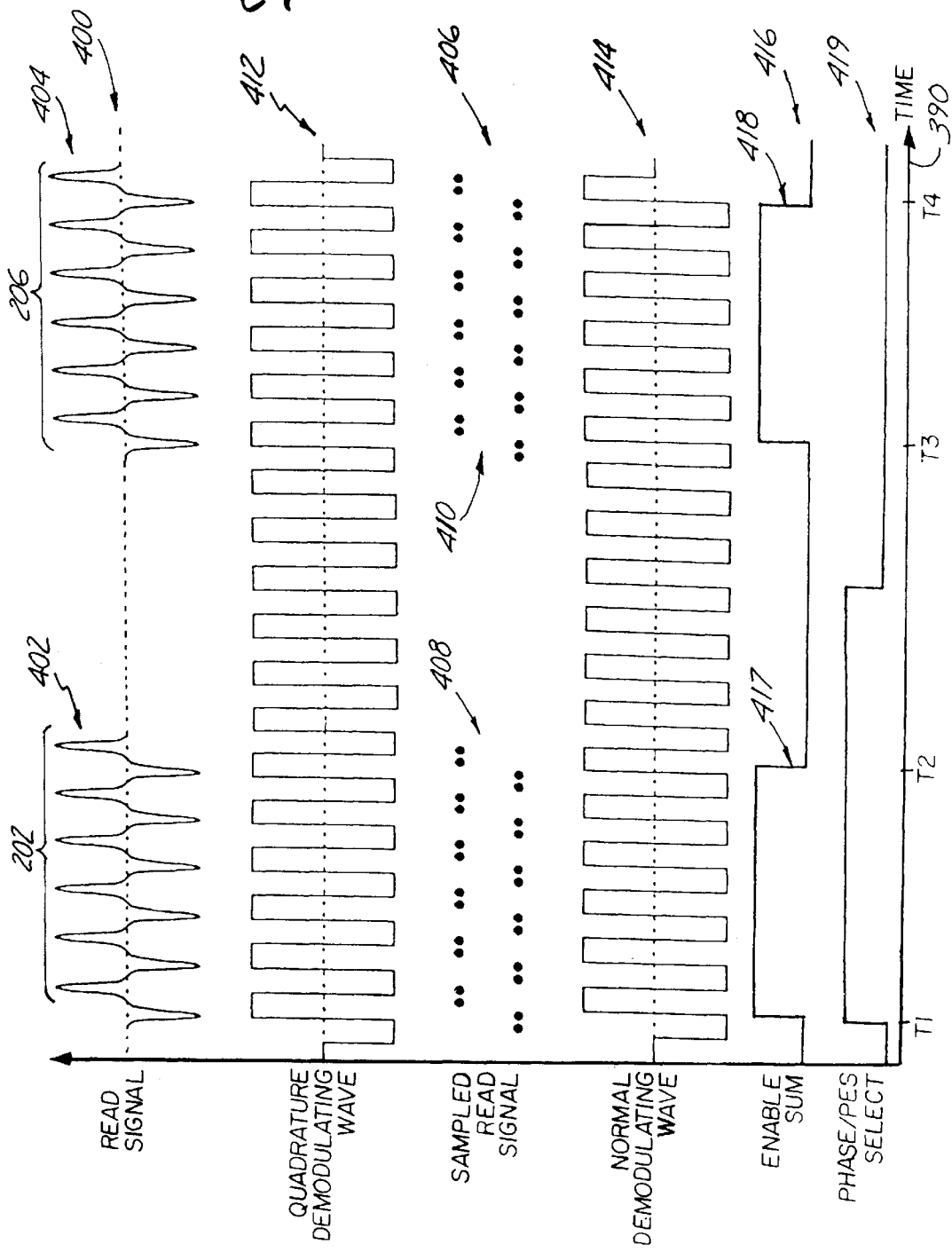

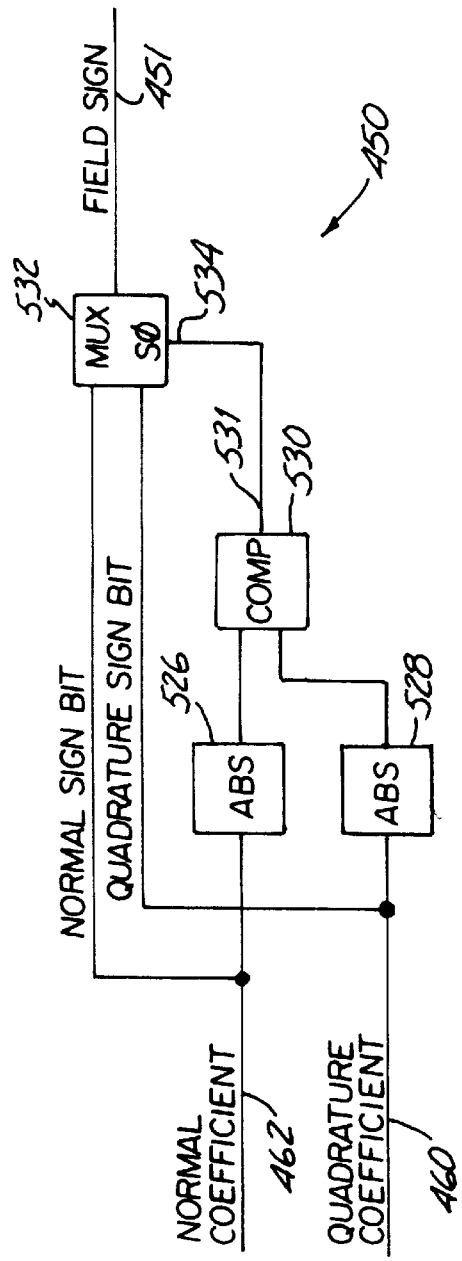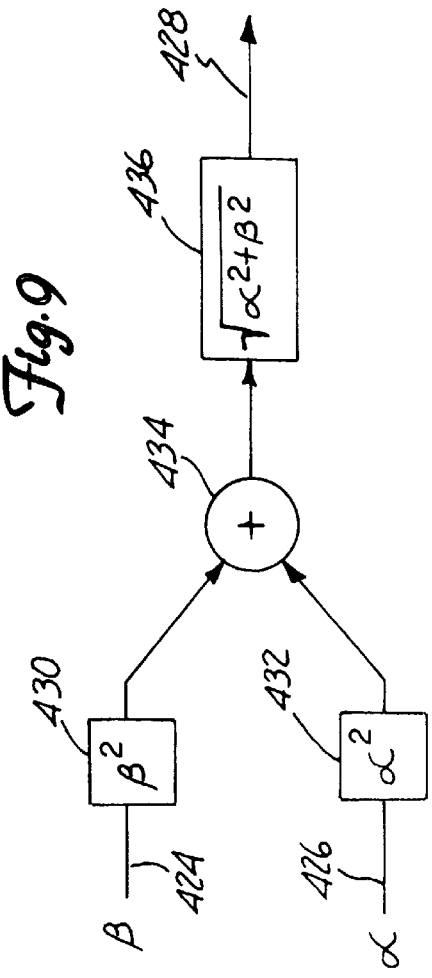
Fig. 10
Fig. 9

ASYNCHRONOUS DIGITAL DEMODULATOR AND METHOD FOR A NULL-TYPE SERVO PATTERN

CROSS-REFERENCE TO RELATED APPLICATION

This application claims the benefit of U.S. Provisional Patent Application No. 60/086,279, entitled "ASYNCHRONOUS DIGITAL DEMODULATION TECHNIQUE FOR A NULL TYPE SERVO PATTERN," filed May 21, 1998, and U.S. Provisional Patent Application No. 60/086,278, entitled "FIELD RATIOING DEMODULATION TECHNIQUES FOR A NULL TYPE SERVO PATTERN," filed May 21, 1998.

Cross-reference is also made to a U.S. Application filed on even date herewith and entitled "ASYNCHRONOUS ANALOG DEMODULATOR AND METHOD FOR A NULL TYPE SERVO PATTERN," which claims priority from U.S. Provisional Patent Application 60/086,276, entitled "ASYNCHRONOUS ANALOG DIGITAL DEMODULATION TECHNIQUE FOR A NULL TYPE SERVO PATTERN," filed May 21, 1998, to a U.S. Application filed on even date herewith and entitled "SYNCHRONOUS DIGITAL DEMODULATOR WITH INTEGRATED READ AND SERVO CHANNELS," which claims prior from U.S. Provisional Patent Application 60/090,776, entitled "SYNCHRONOUS DIGITAL DEMODULATION TECHNIQUES FOR A NULL TYPE SERVO PATTERN," filed June 26, 1998, and from a U.S. Application filed on even date herewith and entitled "METHOD AND APPARATUS UTILIZING FIELD RATIOING DEMODULATION TECHNIQUES FOR A NULL TYPE SERVO PATTERN," which claims prior from U.S. Provision Patent Application No. 60/086,278, entitled "FIELD RATIOING DEMODULATION TECHNIQUES FOR A NULL TYPE SERVO PATTERN," filed May 21, 1998, which are assigned to the same assignee.

BACKGROUND OF THE INVENTION

The present invention relates to a servo system in a data storage device and, in particular, to the demodulation of position error signals (PES) within the servo system.

A data storage device, such as a magnetic disc drive, stores data on a recording medium. The recording medium is typically divided into a plurality of generally parallel data tracks. In a magnetic disc drive, the data tracks are arranged concentrically with one another, perpendicular to the disc radius. The data is stored and retrieved by a transducer or "head" that is positioned over a desired data track by an actuator arm.

The actuator arm moves the head in a radial direction across the data tracks under the control of a closed-loop servo system based on servo data stored on the disc surface within dedicated servo fields. The servo fields can be interleaved with data sectors on the disc surface or on a separate disc surface that is dedicated to storing servo information. As the head passes over the servo fields, it generates a readback servo signal that identifies the location of the head relative to the centerline of the desired track. Based on this location, the servo system rotates the actuator arm to adjust the head's position so that it moves toward a desired position.

There are several types of servo field patterns, such as a "null type" servo pattern, a "split-burst amplitude" servo pattern, and a "phase type" servo pattern. A null type servo pattern includes at least two fields which are written at a known phase relation to one another. The first field is a "phase" or "sync" field which is used to lock the phase and frequency of the read channel to the phase and frequency of the readback signal. The second field is a position error field which is used to identify the location of the head with respect to the track centerline.

As the head passes over the position error field, the amplitude and phase of the readback signal indicates the magnitude and direction of the head offset with respect to the track centerline. The position error field has a null-type magnetization pattern such that when the head is directly straddling the track centerline, the amplitude of the readback signal is ideally zero. As the head moves away from the desired track centerline, the amplitude of the readback signal increases. When the head is half-way between the desired track centerline and the centerline of the adjacent track, the readback signal has a maximum amplitude. The magnetization pattern on one side of the centerline is written 180° out of phase with the magnetization pattern on the other side of the centerline. Thus, the phase of the readback signal indicates the direction of the head position error.

To control the servo system a single position error value must be determined for each pass over the position error field. Typically, the magnitude of the position error value indicates the distance of the head from the track centerline, and the sign of the position error value indicates the direction of the head's displacement. The position error values are typically created by demodulating the readback signal associated with the position error field. Demodulation of the readback signal from the null pattern has, in the past, always been a synchronous process. In a synchronous process, the exact phase of the readback signal from the position error field is known from the phase field's readback signal because the phase field is written on the storage medium at a known and fixed phase relation to the position error field. A phase-locked loop (PLL) is typically used to acquire the phase of the phase field, and this phase information is used for demodulating the position error field. The phase field must therefore be sufficiently long to enable the PLL to lock on to the phase and frequency of the readback signal. For example, the phase field may be 3 times longer than the position error field.

In a servo sector scheme, with servo fields interleaved with data fields, long phase fields consume valuable data sectors on the storage medium. These data sectors could otherwise be used for storing data. As disc storage capacity requirements continue to increase, there is a continuing need for reducing the area consumed by servo data.

The present invention addresses these and other problems, and offers other advantages over the prior art.

SUMMARY OF THE INVENTION

The present invention relates to an asynchronous digital demodulator and method which solve the above-mentioned problems.

One embodiment of the present invention provides a method for determining a position error of a read head relative to a position on a medium in a storage device based on a read signal from a servo area on the medium. The method includes generating a normal demodulating signal that is asynchronous with the read signal and generating a quadrature demodulating signal that is ninety degrees out of phase with the normal demodulating signal. The read signal is sampled to produce a series of digital read sample values. The normal demodulating signal is multiplied by the series of digital read sample values to produce a plurality of normal sample values. The quadrature demodulating signal is multiplied by the series of digital read sample values to produce a plurality of quadrature sample values. A position error magnitude and a position error direction are produced based on the plurality of normal and quadrature sample values.

Yet another aspect of the present invention provides a method for determining a position error estimate having a magnitude and a sign indicative of the distance and direction that a read head is displaced relative to a location on a storage medium. The method includes generating a phase field read signal from a phase field on the medium and sampling the phase field read signal to produce a series of digital phase field sample values. A position error field read signal is generated from a position error field on the medium and is sampled to produce a series of digital position error field sample values. The series of digital position error field sample values are demodulated using at least one demodulating signal to produce at least one position error field coefficient, the at least one demodulating signal being asynchronous to the position error field read signal. The series of digital phase field sample values are demodulated using at least one demodulating signal to produce at least one phase field coefficient. The magnitude of the position error estimate is determined eased at least in part on the at least one position error field coefficient, and the sign of the position error estimate is determined based at least in part on the at least one position error field coefficient and the at least one phase field coefficient.

Another aspect of the present invention provides a disc drive storage device for accessing data on a storage medium. The disc drive includes a read head for generating a read signal. A servo system positions the read head over the medium based in part on a position error estimate that represents the distance and direction that the read head is displaced from a location on the medium. A normal signal generator generates a normal demodulating signal. A quadrature signal generator generates a quadrature demodulating signal that is orthogonal to the normal demodulating signal. An analog-to-digital converter samples the read signal and generates a series of digital read sample values. A normal multiplier multiplies the series of digital read sample values by the normal demodulating signal to produce a plurality of normal sample values. A quadrature multiplier multiplies the series of digital read sample values by the quadrature demodulating signal to produce a plurality of quadrature sample values. A magnitude determination circuit determines a magnitude of the position error estimate based at least in part on the plurality of normal sample values and the plurality of quadrature sample values. A sign determination circuit determines a sign of the position error estimate based at least in part on the plurality of normal sample values.

Yet another aspect of the present invention provides a disc drive storage device for accessing data on a medium, wherein the device includes a servo structure for positioning a head over the medium based on a position error for the head relative to the medium. The device further includes digital demodulation means for receiving a read signal from the head and generating the position error asynchronously to the read signal.

BRIEF DESCRIPTION OF THE DRAWINGS

FIG. 8 is a waveform diagram illustrating various waveforms in the demodulator circuit shown in FIG. 7 over time.

FIG. 9 is a diagram of a square root of the sum of the squares circuit.

FIG. 10 is a block diagram of a sign detector circuit used in the demodulator circuit shown in FIG. 7 according to one embodiment of the present invention.

DETAILED DESCRIPTION OF THE PREFERRED EMBODIMENTS

Figure 1:
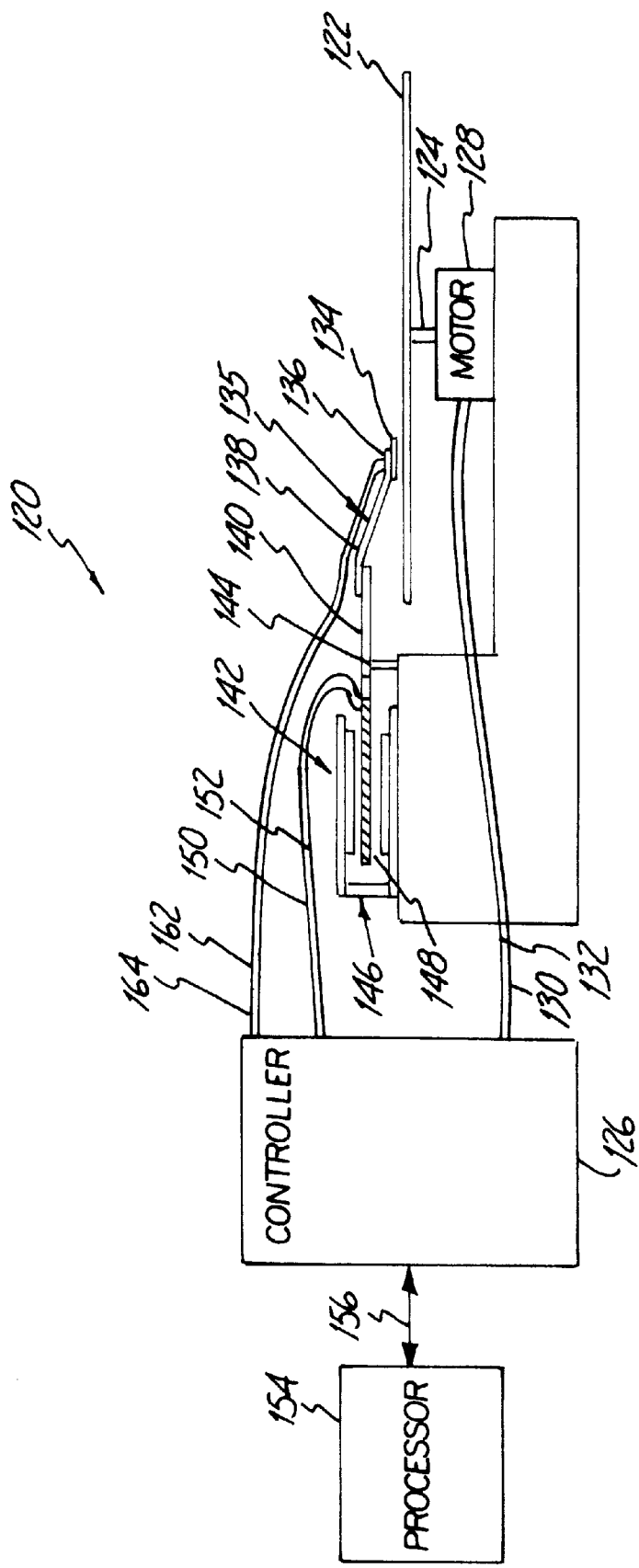
FIG. 1 is a combination block diagram and schematic side view of a data storage system according to one embodiment of the present invention.

FIG. 1 is a combination block diagram and schematic side view of a data storage system 120 according to one embodiment of the present invention. In system 120, a disc 122 rotates about a spindle 124 under the control of controller 126 acting through spindle motor 128. Controller 126 is connected to motor 128 through motor control conductors 130 and 132.

A head 134 is positioned over the surface of disc 122 through a suspension assembly 135 which includes a gimbal 136, a load beam 138, a support arm 140, and an actuator 142. Actuator 142 rotates suspension assembly 135 about pivot point 144, which causes head 134 to move radially in an arc over the surface of disc 122.

Actuator 142 includes magnetic assembly 146 and magnetic coil 148. Magnetic coil 148 is formed on actuator arm 140 on the opposite side of pivot point 144 from load beam 138. Conductors 150 and 152 are connected between magnetic coil 148 and controller 126. Controller 126 passes a current through conductors 150 and 152, which causes magnetic coil 148 to produce a magnetic field that interacts with magnetic fields generated by magnetic assembly 146. This interaction causes actuator arm 140 to rotate about pivot 144 and thereby position head 134 over a desired data track on the surface of disc 122.

During head positioning, processor 154 communicates a desired speed for motor 128 and a desired location for head 134 to controller 126 over bi-directional bus 156. In addition, controller 126 receives readback signals from head 134 through read conductors 162 and 164. In an embedded servo scheme, servo sectors are interleaved with data sectors on the same surface of disc 122. As head 134 passes over a servo sector, the magnetization patterns within the servo sector generate a servo signal in the readback signal. Controller 126 monitors the servo signal to determine the current location of the head. Based on the current location of head 134, and the desired location received from processor 154, controller 126 adjusts the current applied to magnetic coil 148.

Figure 2:
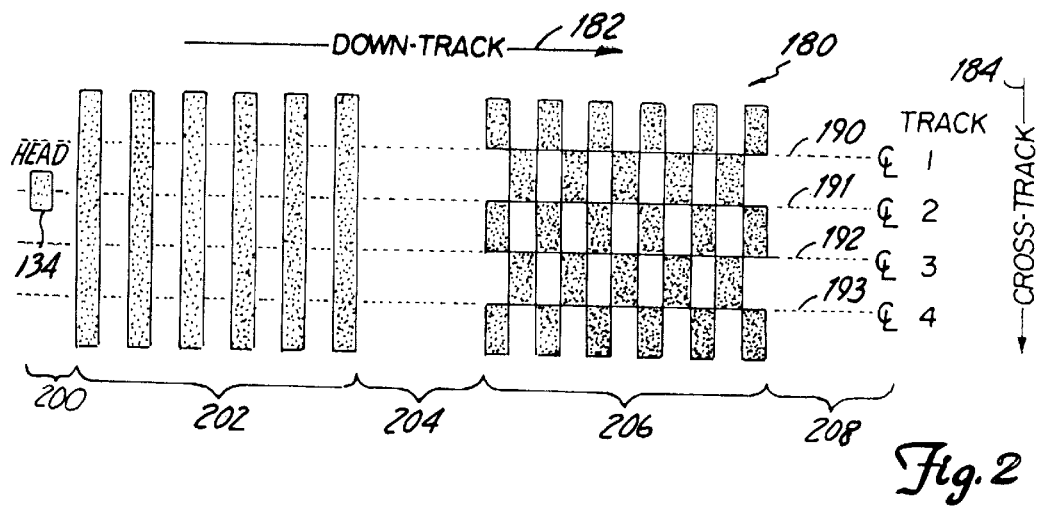
FIG. 2 is a diagram showing a null-type servo magnetization pattern used in one embodiment of the present invention and in the prior art.

FIG. 2 is a diagram showing the essential portions of a null type servo magnetization pattern for a servo section 180 used in one embodiment of the present invention and in the prior art. The radial dimension of disc 122 is shown vertically, and the angular dimension of disc 122 is shown horizontally. Arrow 182 indicates a down-track direction, or angular dimension, of disc 122. Arrow 184 indicates a cross-track direction, or radial dimension, of disc 122. FIG. 2 shows four track centers 190, 191, 192 and 193, which are labeled "1", "2", "3" and "4", respectively. Head 134 is aligned with track center "2" along cross-track direction 184.

The shaded regions in FIG. 2 correspond to regions of opposite magnetic polarity as compared to the non-shaded regions. For example, in a longitudinal recording system, if the longitudinal magnetization in the non-shaded regions is right-to-left in the figure, then the longitudinal magnetization in the shaded regions would be left-to-right. Within these regions, the magnetic medium is saturated in either longitudinal direction, as is standard practice in digital magnetic recording.

Servo sector 180 includes leading fields 200, "sync" or "phase" field 202, middle fields 204, position error field 206 and trailing fields 208. Leading fields 200, middle fields 204 and trailing fields 208 may be "empty" as shown in FIG. 2 or may include additional servo data. For example, leading fields 200 includes a write recovery field and middle fields 204 includes a track number and a sector number. Phase field 202 contains radially coherent magnetic transitions. As head 134 passes over phase field 202, the magnetization pattern within phase field 202 induces an oscillating signal in the output of head 134. Position error field 206 contains a null-type magnetic pattern. The null-type magnetic pattern in position error field 206 is written in a predetermined phase relation to the magnetic pattern in phase field 202. Position error field 206 can also include a set of quadrature null patterns (not shown) which are offset by one-half of a track width with respect to the original, normal null burst patterns.

In the prior art, a phase-locked loop is typically used to lock onto the phase and frequency of the oscillating signal induced by phase field 202 and to generate a demodulating or mixing signal having a phase which is synchronized with the phase of the oscillating signal. The mixing signal is used to demodulate the position error signal from position error field 206. Demodulating the readback signal involved multiplying the readback signal by the mixing signal and integrating the result to produce a position error value. Because the null-type servo pattern is written at the same frequency as the phase field and at a fixed phase relation to the phase field, multiplying the two signals produces either a positively rectified signal or a negatively rectified signal. At the track center, the rectified signal will have zero magnitude because the position error signal is zero at the track center. If head 134 is displaced to one side of the track center, the rectified signal is positive, and if head 134 is displaced to the other side of the track center the rectified signal is negative.

Phase field 202 has also been used for automatic gain control (AGC) in order to maintain the amplitude of the readback signal in the same scale range independent of the radial position of head 134. Automatic gain control is used to normalize the demodulated position error to maintain the same slope (gain) in cross-track direction 184.

Figure 3:
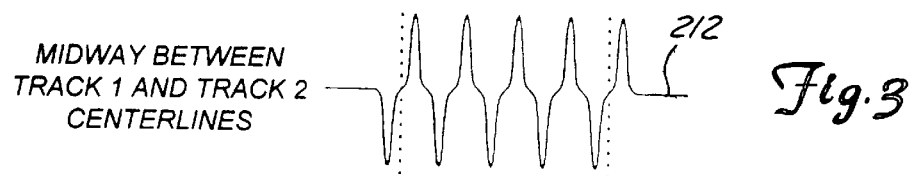
FIG. 3 is a waveform diagram showing a portion of a readback signal produced by a head passing over a position error field in the pattern shown in FIG. 2 while directly straddling a track centerline.
Figure 5:
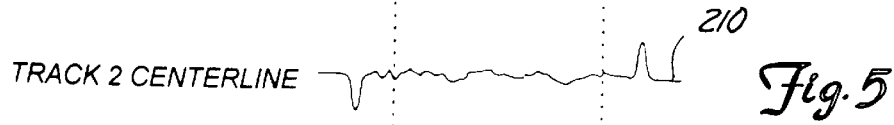
FIG. 5 is a waveform diagram showing a portion of the readback signal produced while the head is positioned on the other side of the desired track centerline.
Figure 4:
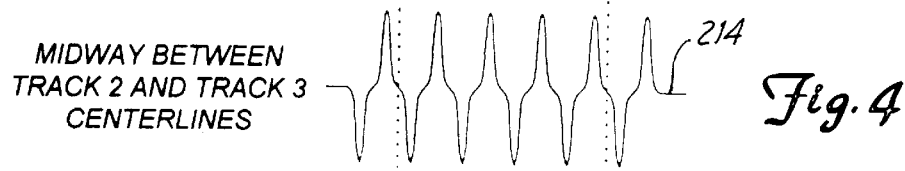
FIG. 4 is a waveform diagram showing a portion of the readback signal produced while the head is positioned on one side of the desired track centerline.

FIG. 3 is a waveform diagram showing a portion of the readback signal as head 134 passes over position error field 206 while directly straddling centerline 191 of track 2. The readback signal from head 134 is substantially zero. FIG. 4 is a waveform diagram showing a portion of the readback signal when head 134 is half-way between centerlines 190 and 191 of tracks 1 and 2, respectively. FIG. 5 is a waveform diagram showing a portion of the readback signal when head 134 is half-way between centerlines 191 and 192 of tracks 2 and 3, respectively. Note that the readback signal in FIG. 5 is 180° out of phase from the readback signal in FIG. 4. It is this phase difference that causes the rectified signal to be positive or negative, depending on which direction head 134 is displaced from the track center.

Figure 6:
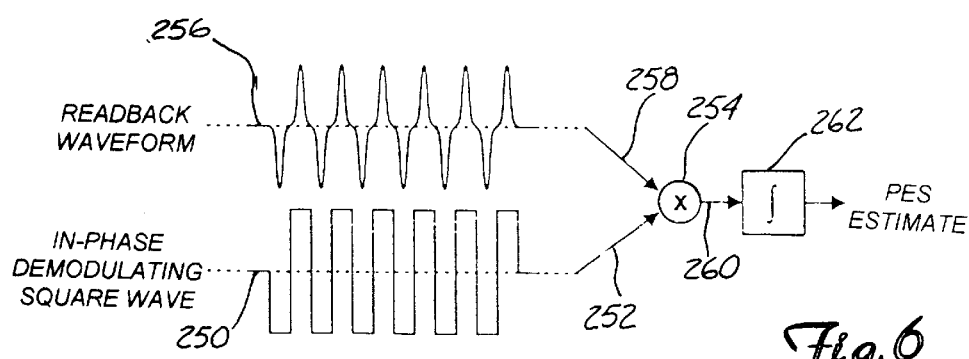
FIG. 6 is a diagram illustrating a synchronous analog method according the prior art.

FIG. 6 is a diagram illustrating a synchronous analog method of demodulating the null magnetization pattern in position error field 206 to generate a position error, according the prior art. First, a phase-locked loop (not shown) locks on to the phase and frequency of the readback waveform generated by phase field 202 (shown in FIG. 2) and produces a demodulating square wave signal 250 having the same phase and frequency relation with respect to a fundamental component of the readback waveform. Square wave 250 is applied to a first input 252 of a multiplier 254. Next, the readback waveform 256 that is generated by position error field 206 is applied to a second input 258 of multiplier 254 Multiplier 254 multiples readback waveform 256 with demodulating square wave signal 250 and applies the result on output 260 to integrator 262.

Integrator 262 integrates the result over a sample integration time window to obtain the position error for that head location. The sample integration time window preferably incorporates the middle cycles of the readback waveform that is generated by position error field 206 because additional cycles outside this window may contribute to errors in the position error value. This is especially important if pulse superposition causes large leading and trailing pulses to occur or if there is magnetic interaction with other fields in servo section 180.

In the example shown in FIG. 6, the position error estimate at the output of integrator 262 will be positive. If readback waveform 256 were 180° out of phase from the one shown in FIG. 6, the position error estimate would be negative. The sign of the position error estimate indicates which direction head 134 is in relation to the track centerline. The synchronous analog demodulation method rejects signals that are orthogonal to the demodulating square wave 250. These orthogonal types of noise signals occur when there is some amount of radial incoherence in the pattern. This demodulation scheme rejects a significant portion of readback signal 250 that results from phase incoherence, which yields an accurate position error estimate.

The performance of the prior art synchronous system is highly dependent on the accuracy of the phase-locked loop. If the phase of the rectifying signal provided by the phase-locked loop is not aligned with the phase of the phase field, the rectified signal will have both positive and negative components, and the position error value will be inaccurate. To avoid this result, prior art systems have used larger phase fields to ensure proper phase locking.

Figure 7:
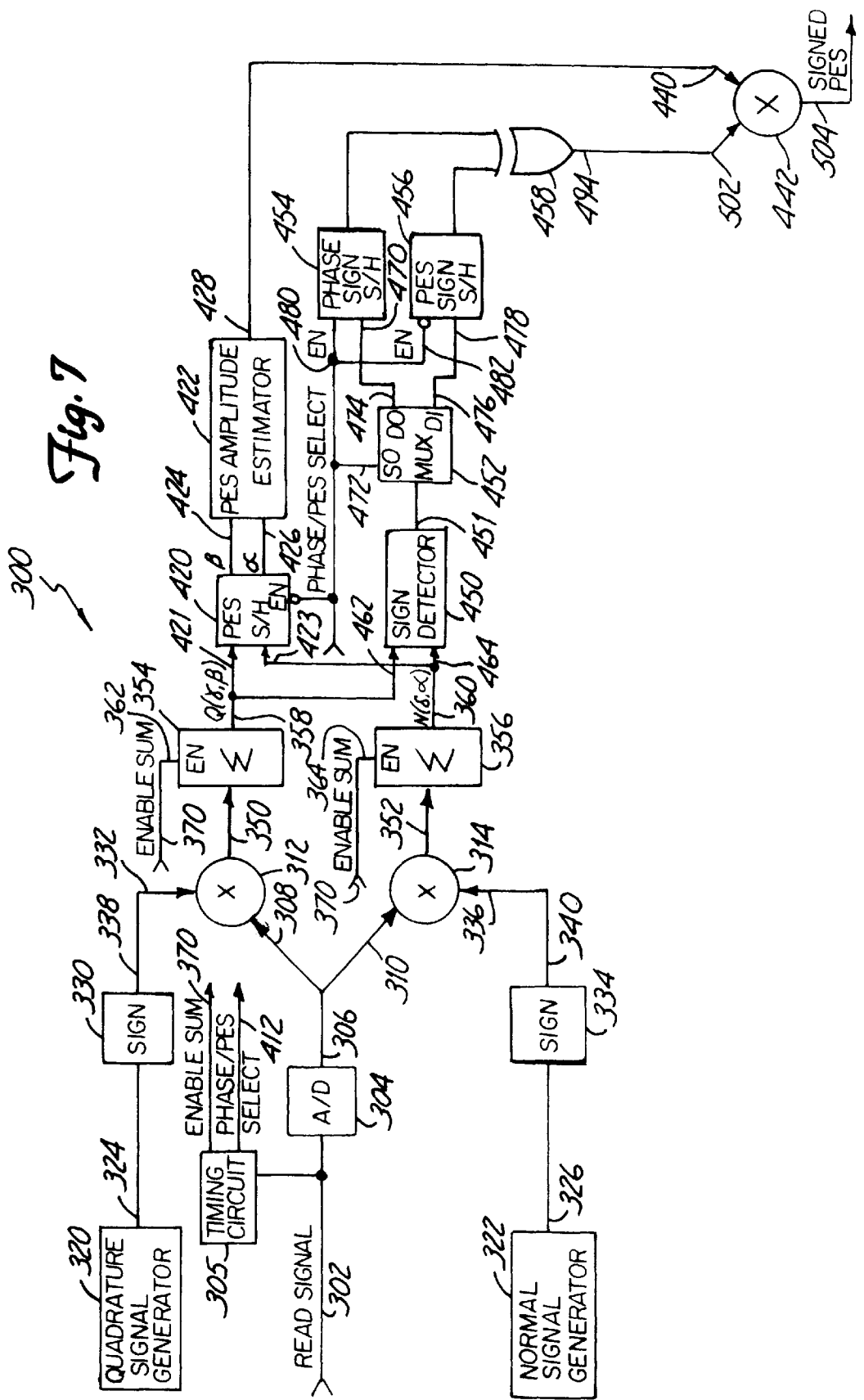
FIG. 7 is a block diagram of an asynchronous digital demodulator circuit according to one embodiment of the present invention.

FIG. 7 is a block diagram of an asynchronous, digital demodulator circuit for a null-type pattern according to one embodiment of the present invention. Demodulator circuit 300 has a read signal input 302 which is coupled to analog-to-digital (A/D) converter 304 and timing circuit 305. A/D converter 304 samples the raw read signal received on input 302 at or above the Nyquist rate and converts the samples to a series of digital read values which are provided to output 306. The digital read values on output 306 are applied to inputs 308 and 310 of multipliers 312 and 314, respectively.

Quadrature signal generator 320 generates a square-wave quadrature demodulating signal on output 324 which has the same fundamental frequency as the raw read signal received on input 302 from servo sector fields 202 and 206 (shown in FIG. 2). Normal signal generator 322 generates a square-wave normal demodulating signal on output 326 which also has the same fundamental frequency as the raw read signal received on input 302 but is 90° out of phase with, or orthogonal to, the quadrature demodulating signal on output 324.

In one embodiment, quadrature and normal signal generators 320 and 322 include voltage-controlled oscillators (VCOs) that are set to oscillate at the known frequency at which data is written within servo fields 202 and 206. However, the phases of the normal and quadrature square-waves are independent of the phase of the read signal. As such, demodulator 300 can be referred to as an "asynchronous" demodulator, and the normal and quadrature demodulating signals can be referred to as asynchronous demodulating signals.

Sign circuit 330 is coupled between output 324 of quadrature signal generator 320 and input 332 of multiplier 312. Similarly, sign function 334 is coupled between output 326 of normal signal generator 322 and input 336 of multiplier 314. Sign circuits 330 and 334 sample the signs of the quadrature and normal demodulating signals and generate a series of digital sign values (such as a series of "0's" and "1's") on outputs 338 and 340 which are multiplied against the series of digital read samples by multipliers 312 and 336, respectively. The outputs 338 and 340 of circuits 330 and 334 toggle between "0" and "1" (e.g. "positive" and "negative") every half cycle of the quadrature and normal demodulating signals. In an alternative embodiment, quadrature and normal signal generators 320 and 322 generate series of signed digital words which are digitally multiplied against corresponding digital read samples by multipliers 312 and 336.

Square-wave demodulating signals and sign circuits are fairly simple to implement and provide a high quality position error signal, as described in more detail below. In alternative embodiments, other demodulation signals can be used such as orthogonal sinusoidal waves (sine and cosine). The digital read values could be multiplied by corresponding sampled values of the demodulation signals.

Outputs 350 and 352 of multipliers 312 and 314 provide a plurality of quadrature sample values and normal sample values and are coupled to the inputs of accumulators 354 and 356, respectively. Multipliers 312 and 314 essentially "flip" or "invert" the sign of a digital read value when the sign of the corresponding demodulating signal is negative. When the sign of the corresponding demodulating signal is positive, the sign of the digital read value is not flipped.

Accumulators 354 and 356 accumulate the signed quadrature and normal sample values on outputs 350 and 352 during selected time windows to obtain a scaled quadrature Fourier coefficient estimate on output 358 and a scaled normal Fourier coefficient estimate on output 360. The quadrature and normal Fourier coefficient estimates are labeled "Q" and "N" on outputs 358 and 360, respectively. Accumulators 354 and 356 are enabled during the middle cycles of phase field 202 to accumulate a phase portion of the plurality of quadrature and normal sample values and thereby generate a phase field quadrature Fourier coefficient γ on accumulator output 358 and a phase field normal Fourier coefficient δ on accumulator output 360. Accumulators 354 and 356 are enabled during the middle cycles of position error field 202 to accumulate a position error portion of the plurality of quadrature and normal sample values and thereby generate a position error field quadrature Fourier coefficient β on accumulator output 358 and a position error field normal Fourier coefficient α on accumulator output 360. Accumulators 354 and 356 have enable inputs 362 and 364 which are coupled to enable sum output 370 of timing circuit 305 for enabling each circuit during the desired time windows.

Timing circuit 305 is coupled to read input 302 and activates enable sum output 370 during the middle cycles of phase field 202 and position error field 206. Enable sum output 370 is activated at a predetermined time following detection of a synchronization or servo address mark ("SAM"), for example, in middle fields 204. Timing circuit 305 also generates a phase/PES select signal on output 412 which is toggled at a predetermined time following phase field 202 and before PES field 206, as discussed in more detail below.

FIG. 8 is a waveform diagram illustrating various waveforms in demodulator circuit 300 over a time axis 390. Waveform 400 represents the read signal received on read input 302. Read signal 400 includes servo bursts 402 from phase field 202 and servo bursts 404 from position error field 206. The plurality of digital read values generated at output 306 of A/D converter 304 is shown at 406 in the middle of the diagram. Each dot represents the magnitude and sign of read signal 400 for the corresponding sample. Dots 408 represent sampled values of the read signal 400 within phase field 202. Dots 410 represent sampled values of read signal 400 within position error field 206.

Waveforms 412 and 414 represent the quadrature and normal demodulating square waves generated on outputs 324 and 326, respectively. These signals are 90° out of phase with one another. Waveform 416 represents the enable sum signal generated on enable output 370 of timing circuit 305. The enable sum signal goes active at time T1 and inactive at time T2 to define a phase field accumulation time window 417 during which accumulators 354 and 356 are enabled for generating the phase field Fourier coefficients. The enable sum signal goes active again at time T3 and inactive at time T4 to define a position error field accumulation time window 418 during which accumulators 354 and 356 are enabled for generating the position error field Fourier coefficients.

The phase/PES select signal generated by timing circuit 305 on output 412 is active during phase field 202 and inactive during position error field 206. Waveform 419 in FIG. 8 represents the phase/PES select signal. The phase/PES select signal is used in demodulator 300 to route data and control various sample and hold circuits to account for the fact that the servo bursts from phase field 202 and position error field 206 occur at different times.

Accumulators 354 and 356 therefore generate two sets of Fourier coefficients on outputs 358 and 360. The phase field Fourier coefficients γ and δ are generated for the data collected between times T1 and T2 in FIG. 8, and the position error field Fourier coefficients β and α are generated for the data collected between times T3 and T4. Once the phase field and position error field Fourier coefficients are obtained, further signal processing is necessary to obtain a position error amplitude estimate and a position error direction or sign estimate from the Fourier coefficients.

Referring back to FIG. 7, position error field sample and hold circuit 420 has inputs 421 and 423 which are coupled to coupled to accumulator outputs 358 and 360, respectively. Sample and hold circuit 420 is enabled when the phase/PES select signal on output 412 is inactive. Circuit 420 serves to sample and then hold the position error field Fourier coefficients $\beta$ and $\alpha$ that are generated by accumulators 354 and 356. Position error field sample and hold circuit 420 feeds these coefficients to inputs 424 and 426 of position error amplitude estimator circuit 422. Amplitude estimator 422 generates a position error amplitude or magnitude estimate based on the position error field Fourier coefficients stored circuit 420. In one embodiment, circuit 422 generates the position error amplitude estimate using a square root of the sum of the squares circuit, as shown in FIG. 9.

In the circuit shown in FIG. 9, input 424 receives the quadrature position error field coefficient $\beta$, and input 426 receives the normal position error field coefficient $\alpha$. The quadrature and normal coefficients $\alpha$ and $\beta$ are squared by squaring circuits 430 and 432 to produce squared quadrature and normal coefficients which are summed by summing circuit 434. The output of summing circuit 434, $\beta^2+\alpha^2$, is applied to the input of square root circuit 436. Square root circuit 436 generates the position error amplitude estimate on output 428, which is the square root of $\beta^2+\alpha^2$. Referring back to FIG. 7, the position error amplitude estimate generated on output 428 is applied to input 440 of multiplier 442.

The overall sign or direction of the position error is generated by sign detector circuit 450, demultiplexer 452, phase field sign sample and hold circuit 454, position error field sign sample and hold circuit 456, and exclusive-OR (XOR) gate 458. Sign detector circuit 450 has inputs 462 and 464 which are coupled to outputs 358 and 360, respectively, of accumulators 354 and 356. Sign detector circuit 450 has a sign output 451 which is coupled to the input of demultiplexer 452.

During the time window in which the phase field Fourier coefficients $\gamma$ and $\delta$ are present on accumulator outputs 358 and 360, sign detector circuit 450 determines the sign of at least one of the coefficients $\gamma$ and $\delta$ and applies a phase field sign value (e.g., a logical "0" or "1") to sign output 451. Since the phase/PES select signal is active, demultiplexer 452 routes the phase field sign value to demultiplexer output 474, which is coupled to data input 470 of phase field sign sample and hold circuit 454. Sample and hold circuit 454 samples and then holds the phase field sign value based on the phase/PES select signal provided to enable input 480.

During the time window in which the position error field Fourier coefficients $\alpha$ and $\beta$ are present on accumulator outputs 358 and 360, sign detector circuit 450 determines the sign of at least one of the coefficients $\alpha$ and $\beta$ and applies a position error field sign value (e.g., a logical "0" or "1") to sign output 451. Since phase/PES select signal is inactive, demultiplexer 452 routes the phase field sign value to demultiplexer output 476, which is coupled to data input 478 of position error field sign sample and hold circuit 456. Sample and hold circuit 456 samples and then holds the position error field sign value based on the phase/PES select signal provided to enable input 482.

Sample and hold circuits 420, 454 and 456 can include latches or flip-flops, for example, and can be level-triggered or edge-triggered as desired. Timing circuit 305 can be modified as desired to generate the appropriate edge or level on phase/PES select output 412 during the correct time window as is known in the art.

The outputs of sample and bold circuits 454 and 456 are coupled to the inputs of XOR gate 458, which compares the relative sign values. The following table provides a truth table for XOR gate 458.

| PHASE FIELD SIGN | PES FIELD SIGN | OVERALL SIGN |
|---|---|---|
| NEG | NEG | NEG |
| NEG | POS | POS |
| POS | NEG | POS |
| POS | POS | NEG |

The result of XOR gate 458 on output 494 produces the overall sign or direction of the head position error.

Output 494 of XOR gate 458 is coupled to input 502 of multiplier 442. In one embodiment, multiplier 442 multiplies the overall position error sign value on input 502 with the position error amplitude estimate on input 440 to generate a signed position error estimate on output 504. In an alternative embodiment, multiplier 442 simply appends the position error sign value as a sign bit to the position error amplitude estimate.

The signed position error estimate generated by demodulator 300 is used by controller 126 (shown in FIG. 1) to control the radial position of head 134 relative to the desired track centerline on the surface of disc 122.

FIG. 10 is a block diagram of sign detector circuit 450 according to one embodiment of the present invention. If the normal and quadrature Fourier coefficients are close in magnitude, they are both presumed to be above a noise floor of the measurement and are each valid for use in determining the field sign. In that case, one or the other coefficient can be used consistently to obtain the correct field sign. If the two Fourier coefficients differ from one another, then the larger of the coefficients is chosen for the field sign determination in order to avoid sign detection errors due to the use of a Fourier coefficient that is within the noise floor.

This field sign determination can be implemented with a variety of circuits. For example, in FIG. 10, sign detector circuit 450 includes absolute value circuits 526 and 528, comparator 530 and multiplexer 532. The normal and quadrature coefficients of each field are applied to the inputs of absolute value circuits 526 and 528, respectively. Absolute value circuits 526 and 528 determine the absolute values of these coefficients. The output of absolute value circuit 526 is coupled to one of the inputs of comparator 530. The output of absolute value circuit 528 is coupled to the other input of comparator 530. Output 531 of comparator 530 is coupled to select input 534 of multiplexer 532. The sign bits of the normal and quadrature coefficients are applied to respective data inputs of multiplexer 532. The output of multiplexer 532 is coupled to output 451 of sign detector circuit 450.

Comparator 530 compares the absolute values of the normal and quadrature coefficients to one another and generates a multiplexer select signal on output 531 which is indicative of the comparison. For example, comparator can generate a logical "0" on output 531 when the normal coefficient is greater than the quadrature coefficient and a logical "1" on output 531 when the quadrature coefficient is greater than or equal to the quadrature coefficient. When output 531 is a "0", multiplexer applies the normal sign bit to field sign output 451. When output 531 is a "1", multiplexer applies the quadrature sign bit to the overall field sign output 451.

The asynchronous demodulation circuit shown in FIG. 7 was simulated to determine the effects of simple electronics noise, the number of quantization bits in A/D converter 304 and the number of sample points per cycle. One measure of the quality of the signed position error estimate generated by the asynchronous demodulation circuit shown in FIG. 7 is the amount of noise that it will reject. Electronics noise is the simplest case, and is usually taken to be additive white Gaussian noise (AWGN). In the simulations, AWGN was added to the raw read signal, which was first low-pass filtered to help remove the effects of the additive noise before final demodulation.

Figure 11:
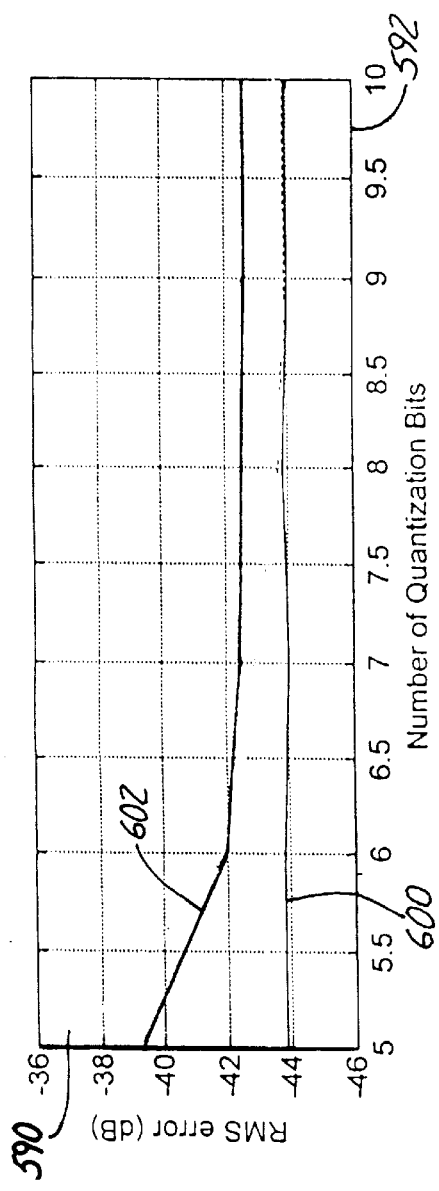
FIG. 11 is a graph showing root mean square (RMS) error of position error magnitude as a function of the number of quantization bits used by an A/D converter in the demodulator shown in FIG. 7.

FIG. 11 is a graph showing root mean square (RMS) error of the position error magnitude, on axis 590, as a function of the number of quantization bits used by A/D converter 304 for sampling the read signal, on axis 592. Having fewer bits in A/D converter 304 is desirable from a speed and cost standpoint. Higher error indicates a lower quality position error. A raw signal-to-noise ratio (SNR) of 20 dB was assumed in the simulation. Here, SNR is defined as the ratio of the square of the zero-to-peak voltage of the isolated read pulse to the noise power over the demodulator bandwidth.

Line 600 shows the RMS error as a function of the number of quantization bits for a synchronous analog demodulation method. Since analog synchronous demodulation method does not use sampling, it is a good benchmark against which to measure the asynchronous digital demodulation method of the present invention. This value is nearly a constant for all quantization bit values. The small variation is due to a finite number of data points in the simulation. The RMS error for the synchronous analog method, shown by line 600, was about −44 dB. Line 602 shows the RMS error as a function of the number of quantization bits for the asynchronous digital demodulation method of the present invention. Line 602 is close to its final asymptotic value at about 6 bits of quantization. At 10 quantization bits, the asynchronous digital demodulation method of the present invention reaches its best performance value which is about 1.5 dB worse than the synchronous analog demodulation method.

Other commonly-used servo patterns, such as split-burst amplitude patterns and associated demodulation techniques, yield position error qualities that are on the order of 6 dB worse than the use of a null-type pattern with analog synchronous demodulation. Therefore, the use of asynchronous digital demodulation is a gain of around 4.5 dB over split-burst amplitude patterns and demodulation methods.

This makes the asynchronous digital null demodulation of the present invention ideal for low cost implementations, where extreme position error quality is not strictly necessary, but where improved position error quality is desired. In addition, a digital demodulation system is easier to integrate into existing digital read channels, which are typically present in a disc drive.

Figure 12:
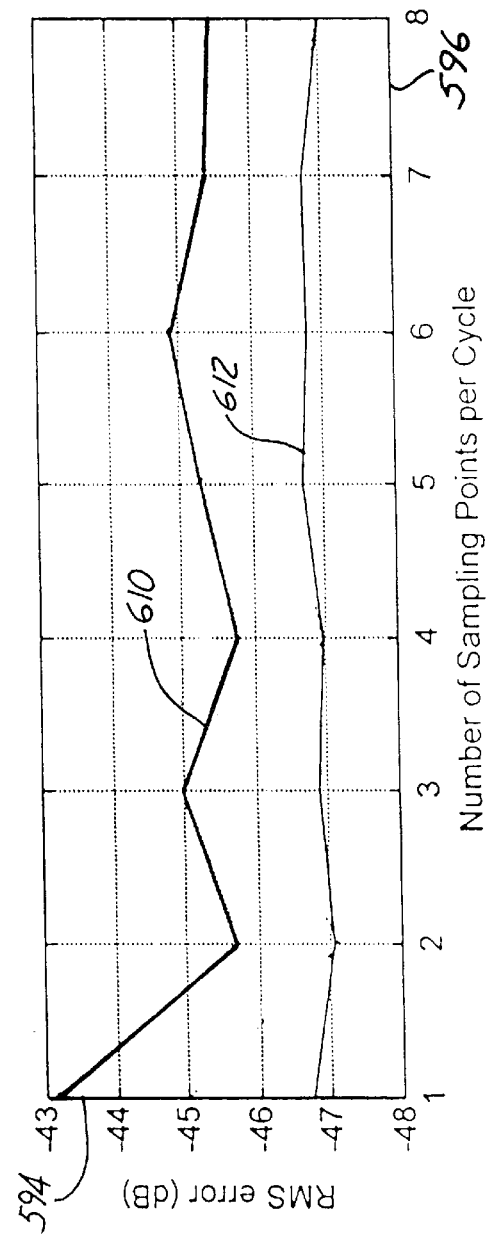
FIG. 12 is a graph illustrating RMS error of position error magnitude as a function of the number of sampling points per cycle of the read signal.

Another consideration of implementing a digital demodulation system is the number of samples per cycle to be used. FIG. 12 is a graph illustrating RMS error (dB) of the position error magnitude estimate, on axis 594, with respect to the number of sampling points per cycle of the read signal, on axis 596. Line 610 represents the RMS error for the asynchronous digital demodulation method, and line 612 represents the RMS error for the synchronous analog demodulation method. The reason for the non-constant value is the same as described above for the case in FIG. 11. Line 610 in FIG. 12 clearly indicates that 2, 4 or 8 samples per cycle are optimum, whereas intermediate numbers of samples per cycle do not provide the same position error quality. However, the loss in quality from using other numbers of sampling points per cycle is on the order of only 0.4 dB. Fewer numbers of samples per cycle are desirable from an implementation standpoint, which would indicate that 2 samples per cycle is preferred. In a real system, however, additive noise is not the only noise source present. Other sources of noise may require more samples per cycle in order to maintain position error quality.

Figure 13:
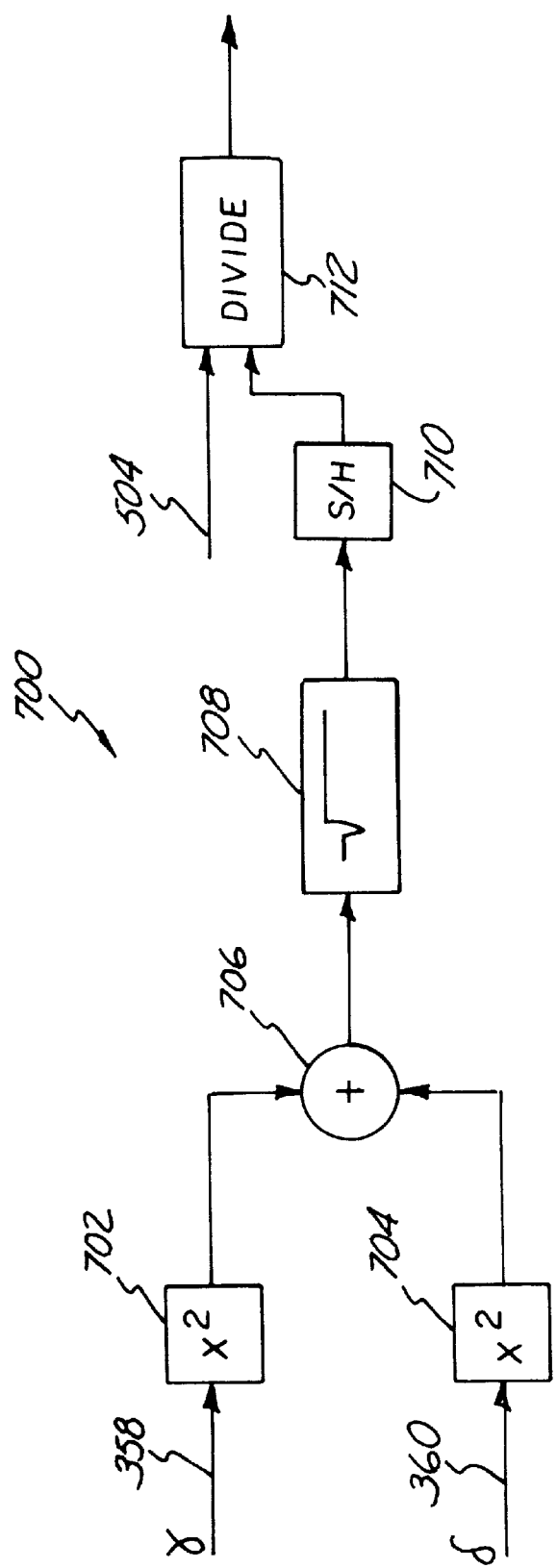
FIG. 13 is a block diagram of a normalization circuit for normalizing the position error magnitude according to an alternative embodiment of the present invention.

In some embodiments, the signed position error estimate produced by demodulator 300 of FIG. 7 at multiplier output 504 is normalized before being used to control the servo system. FIG. 13 is a block diagram of a circuit 700 for performing this normalization. In normalization circuit 700, the phase field Fourier coefficients γ and δ produced by accumulators 354 and 356 of FIG. 7 are provided to squaring circuits 702 and 704, respectively, through connections to accumulator outputs 358 and 360, respectively. Squaring circuits 702 and 704 square each respective coefficient and provide the squares to the inputs of summing circuit 706, which sums the squares. The sum of the squares, $\gamma^2$ and $\delta^2$, is then provided to a square-root circuit 708, which takes the square root of the sum to produce the amplitude of the phase field portion of the readback signal.

This amplitude is stored in sample and hold circuit 710 while the unscaled position error amplitude value is estimated using the techniques discussed above in connection with FIG. 7. When the unscaled position error value appears on output 504 of multiplier 442 of FIG. 7, it is divided by the amplitude of the phase field portion of the readback signal by a division circuit 712, which is connected to the output of sample and hold circuit 710. The output of division circuit 712 is a normalized position error value.

In summary, the present invention provides a disc drive storage device 120 for accessing data on a storage medium 122. The disc drive 120 includes a read head 134 for generating a lead signal 400. A servo system 126, 142, 150, 152, 162 and 164 positions the read head 134 over the medium 122 based in part on a position error estimate 504 that represents the distance and direction that the read head 134 is displaced from a location on the medium 122. A normal signal generator 320 generates a normal demodulating signal 414. A quadrature signal generator 322 generates a quadrature demodulating signal 412 that is orthogonal to the normal demodulating signal 414. An analog-to-digital converter 304 samples the read signal 302 and generates a series of digital read sample values 406. A normal multiplier 314 multiplies the series of digital read sample values 406 by the normal demodulating signal 414 to produce a plurality of normal sample values on output 352. A quadrature multiplier 312 multiplies the series of digital read sample values 406 by the quadrature demodulating signal 412 to produce a plurality of quadrature sample values on output 350. A magnitude determination circuit 354, 356, 420 and 422 determines a magnitude of the position error estimate based at least in part on the plurality of normal sample values on output 352 and the plurality of quadrature sample values on output 350. A sign determination circuit 354, 356 and 450 determines a sign of the position error estimate based at least in part on the plurality of normal sample values.

In one embodiment, the magnitude determination circuit includes a normal accumulator 356 coupled to the normal multiplier 314 for accumulating a portion of the plurality of normal sample values to produce a normal position error coefficient α on output 360 and includes quadrature accumulator 354 coupled to the quadrature multiplier 213 for accumulating a portion of the plurality of quadrature sample values to produce a quadrature position error coefficient β on output 358. A squaring circuit 430 and 432 squares the normal position error coefficient α and the quadrature position error coefficient β to produce squared coefficients. A summing circuit 434 sums the squared coefficients to produce a sum of squares. A square root circuit 436 takes the square root of the sum of squares to produce the magnitude of the position error estimate.

The sign determination circuit includes the normal accumulator 356 which is coupled to the normal multiplier 314 for accumulating a portion of the plurality of normal sample values to produce a normal phase coefficient γ and includes the quadrature accumulator 354 which is coupled to the quadrature multiplier 312 for accumulating a portion of the plurality of quadrature sample values to produce a quadrature phase coefficient δ. The sign determination circuit further includes sign detector circuit 450 which generates the sign of the position error estimate based on a comparison of the sign of the normal phase coefficient γ to the sign of the quadrature phase coefficient δ.

Another aspect of the present invention provides a disc drive storage device 120 for accessing data on a medium 122, wherein the device 120 includes a servo structure 126, 142, 150, 152, 162 and 164 for positioning a head 134 over the medium 122 based on a position error for the head 134 relative to the medium 122. The device 120 further includes digital demodulation means 300 for receiving a read signal 400 from the head 134 and generating the position error asynchronously to the read signal 400.

Yet another aspect of the present invention provides a method for determining a position error of a read head 134 relative to a position on a medium 122 in a storage device 120 based on a read signal 400 from a servo area 180 on the medium 122. The method includes generating a normal demodulating signal 414 that is asynchronous with the read signal 400 and generating a quadrature demodulating signal 412 that is ninety degrees out of phase with the normal demodulating signal 414. The read signal 400 is sampled to produce a series of digital read sample values 406 on output 306. The normal demodulating signal 414 is multiplied by the series of digital read sample values 406 to produce a plurality of normal sample values on output 352. The quadrature demodulating signal 412 is multiplied by the series of digital read sample values 406 to produce a plurality of quadrature sample values on output 350. A position error magnitude and a position error direction are produced on output 494 based on the plurality of normal and quadrature sample values.

Yet another aspect of the present invention provides a method for determining a position error estimate having a magnitude and a sign indicative of the distance and direction that a read head 134 is displaced relative to a location on a storage medium 122. The method includes generating a phase field read signal 402 from a phase field 202 on the medium 122 and sampling the phase field read signal 402 to produce a series of digital phase field sample values 408 on output 306. A position error field read signal 404 is generated from a position error field 206 on the medium 122. The position error field read signal 404 is sampled to produce a series of digital position error field sample values 410 on output 306. The series of digital position error field sample values 410 are demodulated using at least one demodulating signal 412, 414 to produce at least one position error field coefficient α and β, the at least one demodulating signal 412, 414 being asynchronous to the position error field read signal 404. The series of digital phase field sample values 408 are demodulated using at least one demodulating signal 412, 414 to produce at least one phase field coefficient γ and δ. The magnitude of the is position error estimate is determined based at least in part on the at least one position error field coefficient α and β, and the sign of the position error estimate is determined based at least in part on the at least one position error field coefficient α and β and the at least one phase field coefficient γ and δ.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, demodulation of the phase and position error fields can be performed sequentially with the same circuitry or can be performed by parallel circuitry depending on the particular application without departing from the scope and spirit of the present invention. Other modifications can also be made.

What is claimed is:

1. A method for determining a position error of a read head relative to a position on a medium in a storage device based on a read signal from a servo area on the medium having a phase field and a null-type position error field, the method comprising steps of:

(a) generating a normal demodulating signal that is asynchronous with the read signal;

(b) generating a quadrature demodulating signal that is ninety degrees out of phase with the normal demodulating signal and is asynchronous to the read signal;

(c) receiving a phase portion of the read signal as the read head passes over the phase field and a null-type position error portion of the read signal as the read head passes over the null-type position error field;

(d) sampling the phase field portion and the null-type position error portion to produce a series of digital servo values;

(e) multiplying the normal demodulating signal by the series of digital servo values to produce a plurality of normal sample values;

(f) multiplying the quadrature demodulating signal by the series of digital servo values to produce a plurality of quadrature sample values; and (g) producing a position error magnitude and a position error direction based on the plurality of normal and quadrature sample values.

2. The method of claim 1 wherein the sampling step (d) comprises sampling the phase portion to produce a series of digital phase field sample values and sampling the null-type position error portion to produce a series of digital null-type position error field sample values.

3. The method of claim 2 wherein the multiplying step (e) comprises multiplying the series of digital phase field sample values by the normal demodulating signal to produce a phase portion of the plurality of normal sample values and multiplying the series of digital null-type position error field sample values by the normal demodulating signal to produce a position error portion of the plurality of normal sample values.

4. The method of claim 3 wherein the multiplying step (f) comprises multiplying the series of digital phase field sample values by the quadrature demodulating signal to produce a phase portion of the plurality of quadrature sample values and multiplying the series of digital null-type position error field sample values by the quadrature demodulating signal to produce a position error portion of the plurality of quadrature sample values.

5. The method of claim 4 wherein the producing step (g) comprises:
- (g)(i) accumulating the position error portion of the plurality of normal sample values to produce a normal position error coefficient;
- (g)(ii) accumulating the position error portion of the plurality of quadrature sample values to produce a quadrature position error coefficient;
- (g)(iii) squaring the normal position error coefficient and quadrature position error coefficient to produce squares;
- (g)(iv) summing the squares of the normal position error coefficient and the quadrature position error coefficient to produce a sum; and
- (g)(v) taking the square-root of the sum to produce the position error magnitude.

6. The method of claim 4 wherein the producing step (g) comprises:
- (g)(i) accumulating the position error portion of the plurality of normal sample values to produce a normal position error coefficient;
- (g)(ii) accumulating the position error portion of the plurality of quadrature sample values to produce a quadrature position error coefficient;
- (g)(iii) accumulating the phase portion of the plurality of normal sample values to produce a normal phase coefficient;
- (g)(iv) accumulating the phase portion of the plurality of quadrature sample values to produce a quadrature phase coefficient;
- (g)(v) comparing the magnitude of the normal position error coefficient to the magnitude of the quadrature position error coefficient to determine which is a larger magnitude position error coefficient;
- (g)(vi) comparing the magnitude of the normal phase coefficient to the magnitude of the quadrature phase coefficient to determine which is a larger magnitude phase coefficient; and
- (g)(vii) determining the position error direction by comparing the sign of the larger magnitude position error coefficient to the larger magnitude phase coefficient.

7. A method for determining a position error estimate having a magnitude and a sign indicative of the distance and direction that a read head is displaced relative to a location on a storage medium, the method comprising steps of:
- (a) generating a phase field read signal from a phase field on the medium;
- (b) sampling the phase field read signal to produce a series of digital phase field sample values;
- (c) generating a null-type position error field read signal from a null-type position error field on the medium;
- (d) sampling null-type the position error field read signal to produce a series of digital null-type position error field sample values;
- (e) demodulating the series of digital null-type position error values using at least one demodulating signal to produce at least one position error field coefficient, the at least one demodulating signal being asynchronous to the position error field read signal;
- (f) demodulating the series of digital phase field sample values using at least one demodulating signal to produce at least one phase field coefficient;
- (g) determining the magnitude of the position error estimate based at least in part on the at least one position error field coefficient; and
- (h) determining the sign of the position error estimate based at least in part on the at least one position error field coefficient and the at least one phase field coefficient.

8. The method of claim 7 wherein the demodulating step (e) comprises:
- (e)(i) multiplying the series of digital null-type position error field sample values by a normal asynchronous demodulating signal to produce a plurality of normal position error values; and
- (e)(ii) accumulating the plurality of normal position error values to produce a normal position error field coefficient.

9. The method of claim 8 wherein the demodulating step (f) the series of digital phase field sample values comprises:
- (f)(i) multiplying the series of digital phase field sample values by a normal asynchronous demodulating signal to produce a plurality of normal phase values; and
- (f)(ii) accumulating the plurality of normal phase values to produce a normal phase field coefficient.

10. The method of claim 9 wherein the demodulating step (e) comprises:
- (e)(iii) multiplying the series of digital null-type position error field sample values by a quadrature asynchronous demodulating signal that is orthogonal to the normal asynchronous demodulating signal to produce a plurality of quadrature position error values; and
- (e)(iv) accumulating the plurality of quadrature position error values to produce a quadrature position error field coefficient.

11. The method of claim 10 wherein the demodulating step (f) comprises:
- (f)(iii) multiplying the series of digital phase field sample values by a quadrature asynchronous demodulating signal that is orthogonal to the normal asynchronous demodulating signal to produce a plurality of quadrature phase values; and
- (f)(iv) accumulating the plurality of quadrature phase values to produce a quadrature phase field coefficient.

12. The method of claim 11 wherein the determining step (g) comprises:
- (g)(i) squaring the normal position error field coefficient to produce a squared normal coefficient;
- (g)(ii) squaring the quadrature position error field coefficient to produce a squared quadrature coefficient;
- (g)(iii) summing the squared normal coefficient and the squared quadrature coefficient to produce a coefficient sum; and
- (g)(iv) taking the square root of the coefficient sum to produce the magnitude of the position error estimate.

13. The method of claim 11 wherein the determining step (h) comprises comparing the sign of at least one of the normal and quadrature position error field coefficients to the sign of at least one of the normal and quadrature phase field coefficients.

14. The method of claim 11 wherein the determining step (h) comprises:
- (h)(i) comparing the magnitude of the normal position error field coefficient to the magnitude of the quadrature position error field coefficient to identify a larger position error field coefficient;
- (h)(ii) comparing the magnitude of the normal phase field coefficient to the magnitude of the quadrature phase field coefficient to identify a larger phase field coefficient; and
- (h)(iii) comparing the sign of the larger position error field coefficient to the sign of the larger phase field coefficient to determine the sign of the position error estimate.

15. A disc drive storage device for accessing data on a storage medium, the disc drive comprising:
- a read head for generating a null-type servo read signal;
- a null-type servo system for positioning the read head over the medium based in part on a null-type position error estimate that represents the distance and direction that the read head is displaced from a location on the medium;
- a normal signal generator for generating a normal demodulating signal that is asynchronous to the read signal;
- a quadrature signal generator for generating a quadrature demodulating signal that is orthogonal to the normal demodulating signal and is asynchronous to the read signal;
- an analog-to-digital converter for sampling the read signal and generating a series of digital read values;
- a normal multiplier for multiplying the series of null-type digital read values by the normal demodulating signal to produce a plurality of normal sample values;
- a quadrature multiplier for multiplying the series of null-type digital read values by the quadrature demodulating signal to produce a plurality of quadrature sample values;
- a magnitude determination circuit for determining a magnitude of the position error estimate based at least in part on the plurality of normal sample values and the plurality of quadrature sample values; and
- a sign determination circuit comprising:
  - a normal accumulator coupled to the normal multiplier for accumulating a portion of the plurality of normal sample values to produce a normal phase coefficient;
  - a quadrature accumulator coupled to the quadrature multiplier for accumulating a portion of the plurality of quadrature sample values to produce a quadrature phase coefficient; and
  - a sign detector circuit which detects a sign of the position error estimate based on a comparison of the sign of the normal phase coefficient to the sign of the quadrature phase coefficient.

16. The disc drive of claim 15 wherein the magnitude determination circuit comprises:
- a normal accumulator coupled to the normal multiplier for accumulating a portion of the plurality of normal sample values to produce a normal position error coefficient;
- a quadrature accumulator coupled to the quadrature multiplier for accumulating a portion of the plurality of quadrature sample values to produce a quadrature position error coefficient;
- a squaring circuit for squaring the normal position error coefficient and the quadrature position error coefficient to produce squared coefficients;
- a summing circuit for summing the squared coefficients to produce a sum of squares; and
- a square root circuit for taking the square root of the sum of squares to produce the magnitude of the position error estimate.

17. A disc drive storage device for accessing data on a medium, the disc drive comprising:
- a servo structure for positioning a head over the medium based on a position error magnitude and direction for the head relative to the medium; and
- digital demodulation means for receiving a null-type servo read signal from the head, multiplying the null-type servo read signal by normal and quadrature demodulating signals, which are asynchronous to the null-type servo read signal, to produce a series of normal and quadrature sample values and generating the position error magnitude and direction based on the series of normal and quadrature sample values.

* * * * *

UNITED STATES PATENT AND TRADEMARK OFFICE
CERTIFICATE OF CORRECTION

PATENT NO. : 6,243,224 B1
DATED : June 5, 2001
INVENTOR(S) : Alexei H. Sacks et al.

Page 1 of 1

It is certified that error appears in the above-identified patent and that said Letters Patent is hereby corrected as shown below:

<u>Column 15,</u>
Line 63, after "sampling", delete "null-type the" and insert -- the null-type --.

<u>Column 17,</u>
Lines 26, 31, and 33, after "the", insert -- null-type servo --.
Line 34, after "of", insert -- null-type servo --.
Line 36, before "digital", insert -- servo --.
Line 39, after "null-type", insert -- servo --.

Signed and Sealed this

Nineteenth Day of March, 2002

Attest:

JAMES E. ROGAN
*Director of the United States Patent and Trademark Office*

*Attesting Officer*